J. McBRIDE.
Improvement in Gin Saw Sharpeners.
No. 128,553. Patented July 2, 1872.
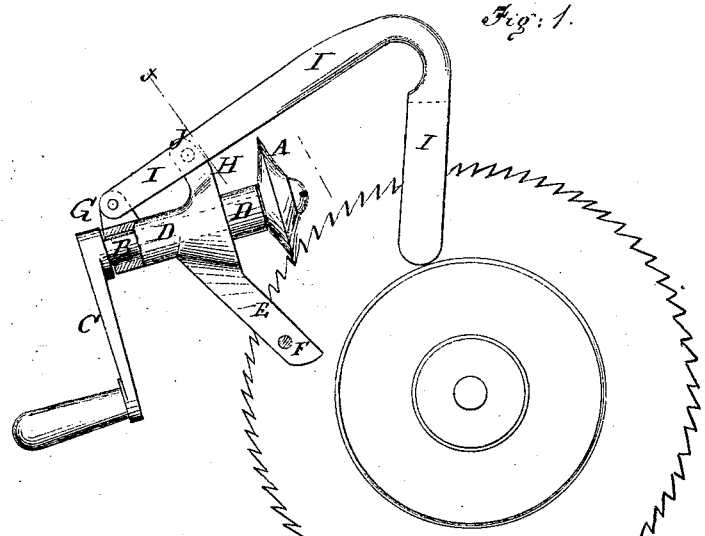
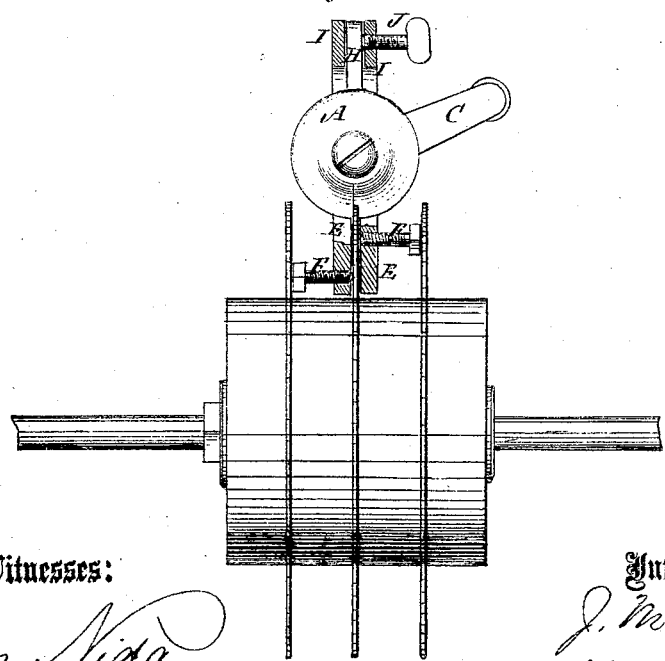

UNITED STATES PATENT OFFICE.

JAMES McBRIDE, OF LILESVILLE, NORTH CAROLINA.

IMPROVEMENT IN GIN-SAW SHARPENERS.

Specification forming part of Letters Patent No. 128,553, dated July 2, 1872.

Specification describing a new and Improved Gin-Saw Sharpener, invented by JAMES MCBRIDE, of Lilesville, in the county of Anson and State of North Carolina.

Figure 1 is a side view of my improved gin-saw sharpener, shown as applied to a gin-saw. Fig. 2 is a detail sectional view of the same taken through the line $x\ x$, Fig. 1.

Similar letters of reference indicate corresponding parts.

My invention has for its object to furnish an improved machine for filing or sharpening the teeth of gin-saws while upon the mandrel or shaft, and which shall be simple in construction and convenient in use, being so constructed as to give the proper form to the teeth to hold the saw firmly and steadily while being operated upon, and to be easily moved from one tooth to another; and it consists in the construction and combination of the various parts of the machine, as hereinafter more fully described.

A is the file, which is made in the form of a small wheel beveled upon its opposite sides to give the proper form to the teeth. The file A is slightly concaved in front, as this form gives greater strength to the small teeth of a gin-saw. The file A is secured to the end of a shaft, B, to the other end of which the crank C is attached for rotating the file. The shaft B revolves in a sleeve, D, upon the lower side of which is formed a leg, E, which is slotted to receive the saw to be operated upon, and which should be of such a length that its end may extend to or nearly to the blocks or washers between the saws. To the opposite sides of the leg E, and preferably at different distances from its end are attached set-screws F, which are designed to be so adjusted that their heads may rest against the saws upon the opposite sides of the saw being operated upon, so as to hold the said saw steady. Upon the upper side of the sleeve D are formed two lugs, G H, which are to receive the shank of the leg I.

The end of the leg I is pivoted to the lug G nearest the crank C, and said leg is adjustably secured to the other lug H by a set-screw, J, so that the pitch of the shaft B may be conveniently adjusted to adjust the rotary file A in proper position upon the teeth of the gin-saw. The forward end of the leg I is bent downward, is slotted to receive the saw to be operated upon, and is made of such a length that its ends may rest upon the blocks placed between the saws.

By this construction, when one tooth has been filed, or rather when the forward side of one tooth and the rear side of the next tooth have been filed, the rear end of the machine is raised to raise the file A sufficiently to clear the teeth, and the machine is moved forward to the next tooth, the end of the leg I slipping readily forward upon the blocks between the saws.

The saws of cotton-gins are not all set upon their shafts at the same distance apart. If they were the screws F might be stationary projections, the object in having them screws being to enable them to be adjusted so that their heads may touch or rest against the sides of the adjacent saws.

Having thus described my invention, I claim as new and desire to secure by Letters Patent—

1. A rotary file for gin-saws, made slightly concave in front, substantially as herein shown and described, and for the purpose set forth.

2. The combination of the set-screws F with the slotted rear leg E of a gin-saw-filing machine, substantially as herein shown and described, and for the purpose set forth.

3. The slotted adjustable leg I, so formed that its forward end may rest upon and slide along the blocks between the saws, substantially as herein shown and described, and for the purpose set forth.

JAMES McBRIDE.

Witnesses:
  ETHERTON WILSON,
  WM. B. WATFORD.